(No Model.)
M. H. DEATHERAGE.
MUD HOOK FOR TRACTION WHEELS.
No. 435,483. Patented Sept. 2, 1890.
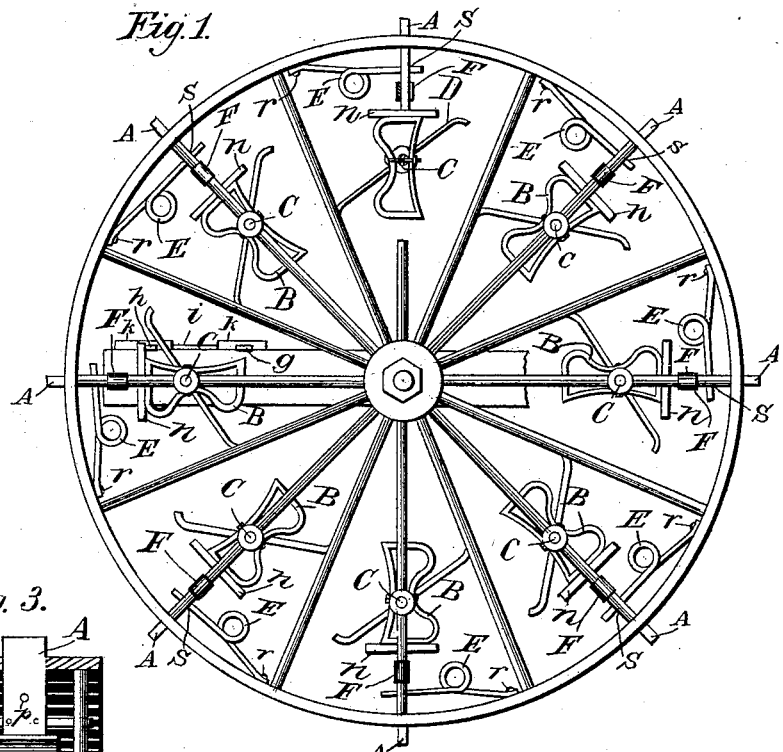
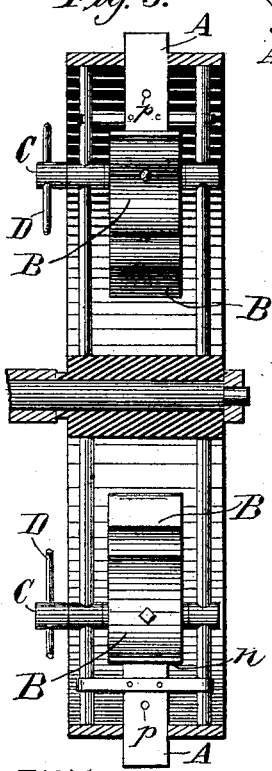
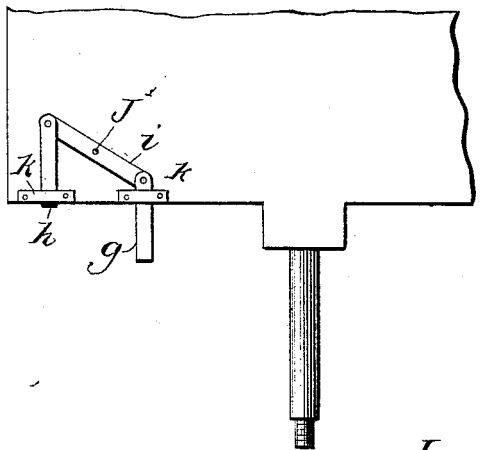
Witnesses:
G. Pickles
L. P. Epple
Inventor:
Matthew Henry Deatherage

UNITED STATES PATENT OFFICE.

MATTHEW HENRY DEATHERAGE, OF NEAR JAMESTOWN, MISSOURI.

MUD-HOOK FOR TRACTION-WHEELS.

SPECIFICATION forming part of Letters Patent No. 435,483, dated September 2, 1890.

Application filed January 4, 1890. Serial No. 335,927. (No model.)

*To all whom it may concern:*

Be it known that I, MATTHEW HENRY DEATHERAGE, a citizen of the United States, residing near Jamestown, in the county of Moniteau and State of Missouri, have invented a new and useful Mud Hook or Lug to be Attached to the Driving-Wheels of Machinery, of which the following is a specification.

My invention relates to mud hooks or lugs which are attached to the driving-wheels of machinery, and more especially to the driving-wheels of traction-engines, with the same number of rotating adjusters operating in conjunction with an adjuster-bar and trip-bar on the platform at the rear end of the furnace of traction-engines; and the objects of my invention are, first, to provide mud hooks or lugs which are automatic or self-adjusting; second, to afford facilities for the proper adjustment of the hooks independently of each other, projecting them through the rim of the wheels, so as to hold in mud, and, third, to arrange the hooks or lugs so that they can be adjusted while the wheels are in motion and be withdrawn automatically at will while the wheels are in motion. When the long end of the adjuster is to be used to throw out the hook farther, it is done by hand. I attain these objects by the mechanism illustrated in the accompanying drawings, in which—

Figure 1 is a side view of the driving-wheel, showing the mechanism connected with the mud-hooks. Fig. 2 is the platform with the adjuster-bar and trip-bar attached. Fig. 3 is a vertical section or part of the drive-wheel, showing how the hooks project beyond the periphery of the wheel and their relation to the adjuster and to the spokes of the drive-wheel.

A are the mud hooks or lugs, and can be projected through the rim or tire of the driving-wheels, or if the rim of the wheels be too narrow to bear cutting a sufficient opening through it the hooks may be made to straddle the rim. The hooks or lugs A are made with a straight bar and with a right-angle foot-piece that rests on the adjuster B. The adjuster B is made nearly in the shape of B; but other shapes will answer. It may be solid or open. Open is the lighter. It has one end longer than the other from the hole where the shaft C goes through. Making the adjuster B thus, the hooks or lugs can easily be projected—say three inches with the shorter end and five inches with the longer—thus adapting the hooks or lugs to shallow or deep mud, the longer end being adjusted by hand only.

The adjuster B is attached to the arms or spokes of the driving-wheels by the shaft C. The shaft C goes through the inner spoke of the driving-wheel, then through the adjuster B, and into the outer spoke, the spokes being made with boxes for that purpose. I prefer having the adjuster B made with a square hole through it for the shaft C and fastened with a set-screw instead of a bolt.

D is a lever-rod that goes through the projecting end of the shaft C.

E is the spring that withdraws the hook when the adjuster is tripped. One end is fastened to the inside of the rim of the driving-wheel, and the other end rests in a hole in the hook made for that purpose.

F are the clasps or collars which act as guides for the hooks. They are attached to the hooks at the foot-piece *n*. The clasp F should be made in two pieces. *g* is the adjuster-bar, and *h* is the trip-bar. They work on bar *i*, of which both ends are movable, it being fastened to the platform in the middle by a pin J.

*g* is on the front end of *i*, and *h* on the rear end. (See Fig. 2.)

*k k* are two slots that hold the projecting ends of *g* and *h* down to the platform.

*l* are the spokes or arms of the driving-wheel, riveted together at *t*, first having been bent so that each spoke makes one-half of the box that the shaft C works in, thereby making the spokes strong enough to bear the weight that they may have to stand if the hook strikes anything solid. *p* is the hole in the hook for the spring. *r* is where the spring is fastened to the rim. The other end of the spring goes into the hook at S.

I am aware that prior to my invention there have been mud-hooks used to hold the driving-wheels of traction-engines from slipping in mud and on slippery hills; but I am not aware that there has ever been made an automatic mud hook, lug, or fang like mine, (the hooks now in use being bolted on by hand.)

Having fully described my invention, what I desire to secure by Letters Patent is—

1. The combination, in automatic mud hooks or lugs A, operated with a set of rotating adjusters B, of shaft C and crank pin or rod D, substantially as set forth.

2. Automatic mud hooks or lugs operated independently of each other by slide-levers $g$ and $h$, substantially as described.

3. The hooks or lugs securely confined by clasps or collars F F, and the spring E holding them in place when not in use, as described.

4. In a mud-hook, a set of hooks or lugs, with foot-piece $n$, that sits squarely on the ends of the adjusters B when in use.

MATTHEW HENRY DEATHERAGE.

Witnesses:
L. F. BURGI,
JAS. M. SHIPLEY.